Figure 1:
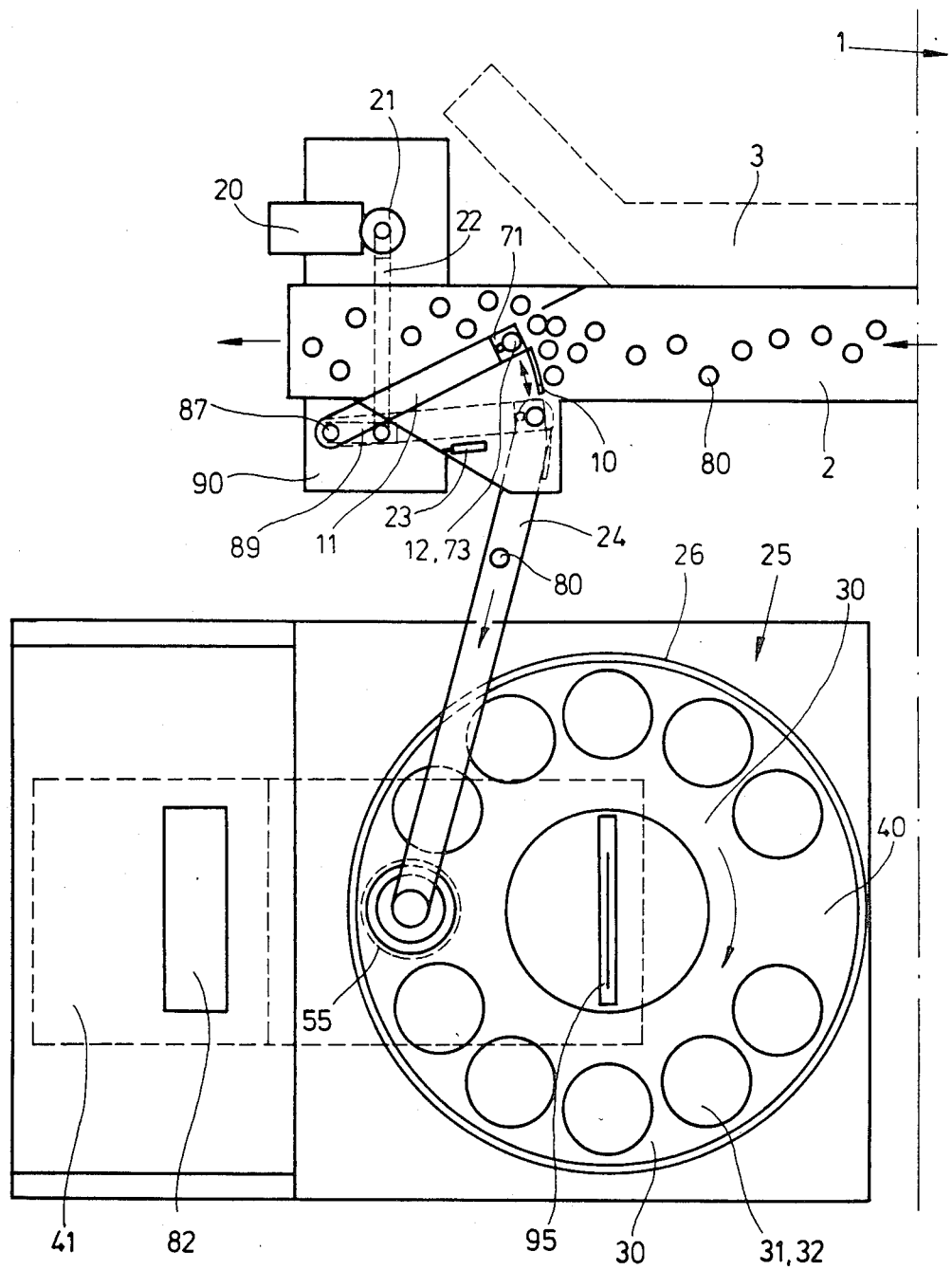

United States Patent [19]

Hinzpeter

[11] Patent Number: 4,640,376
[45] Date of Patent: Feb. 3, 1987

[54] DEVICE FOR TESTING, IN PARTICULAR OF TABLETS BY WEIGHING

[75] Inventor: Jürgen Hinzpeter, Schwarzenbek, Fed. Rep. of Germany

[73] Assignee: Wilhelm Fette GmbH, Schwarzenbek, Fed. Rep. of Germany

[21] Appl. No.: 797,419

[22] Filed: Nov. 12, 1985

[30] Foreign Application Priority Data

Nov. 10, 1984 [EP] European Pat. Off. ........ 84113592.4

[51] Int. Cl.⁴ ........................ G01G 19/52; G01N 1/04
[52] U.S. Cl. .................................. 177/50; 73/863.91
[58] Field of Search ........... 177/50; 73/863.91, 863.92

[56] References Cited

U.S. PATENT DOCUMENTS

| | | | |
|---|---|---|---|
| 3,744,582 | 7/1973 | Withnell et al. | 177/50 |
| 3,881,356 | 5/1975 | Palm | 73/863.91 |
| 3,921,821 | 11/1975 | Champion et al. | 73/863.91 X |
| 4,223,751 | 9/1980 | Ayers et al. | 177/50 X |
| 4,230,195 | 10/1980 | Graffen | 177/50 X |

Primary Examiner—George H. Miller, Jr.
Attorney, Agent, or Firm—Michael J. Striker

[57] ABSTRACT

A device for testing the weight of individual tablets which are filled into containers. Random samples are selected by a pivotable arm with a cage and dropped into a container that has been tared.

11 Claims, 5 Drawing Figures

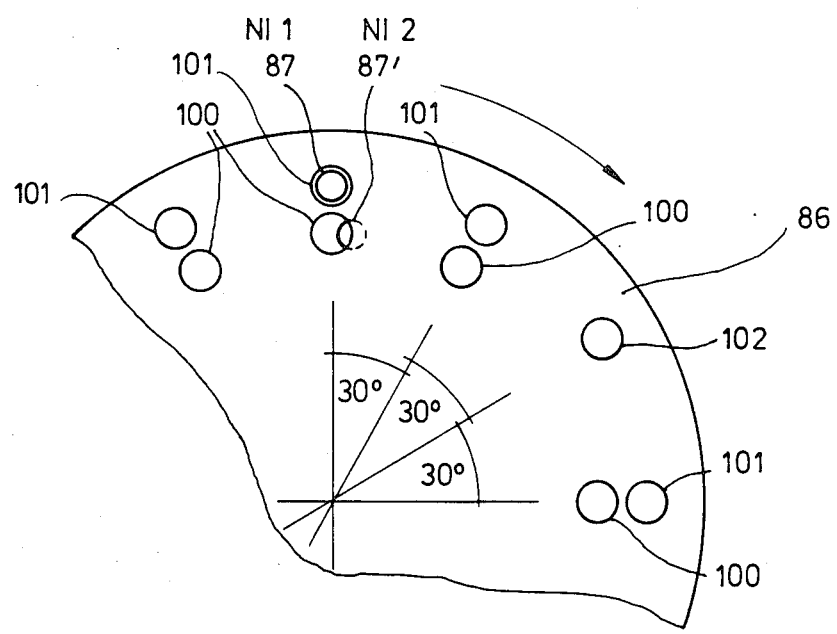

DEVICE FOR TESTING, IN PARTICULAR OF TABLETS BY WEIGHING

The invention relates to a device for testing, in particular of tablets by weighing on a scale on which the the tablets which are filled into containers are individually weighed.

Since the start of making tablets the testing of the quality is of particular importance. Thereby, it suffices to manually pull out random samples from the slowly moving press and to evaluate the same. In rapid moving presses a testing of the manufacturing is performed by means of the control of the press forces which are applied for making the individual tablets. If the controlled press force is held in tight limits there is the possibility that also the three deciding parameters are fullfilled, namely the weight, stability and decay speed of the produced tablets, since the stability and the decay speed are substantially depending from the press force. However, a press force control and aftercontrol contains two unweighables. At first, there is no rigid correlation between the press force and the tablet weight and secondly the press force system may be defective resulting in an incorrect aftercontrol, whereby the weight of the produced tablets is erroneously influenced.

Since an accurate correlation can not be obtained it is still necessary to make random sample testing to establish an accurate tablet weight which has to be performed in more or less timely intervals. Such random samples must meet high requirements, in particular they have to be safely removed, rapidly evaluated and accurately correlated with a possible light economical expense.

It is an object of the invention to provide a device for a safe removing and rapid evaluation of random samples by means of weighing which have to be magazinized into containers. For this purpose the invention provides a device which is equipped with a pivotable arm being pivoted into the flow of the tablets, whereby this arm is provided at its head with a cage for receiving one individual tablet so that the tablet is removed from the particle flow, after a pivoting movement, and is transferred into a container which is positioned in a hole of a rotatably mounted apertured disk below which a scale is mounted for the container, so that the individual tablets are individually weighed and the results can be stored in a computer or, if need be, may be printed in a printing device for the purpose of a later proof concerning the quality of the tablet or also for controlling the tablet press for changing the nominal value of the press force or the thickness of the tablet. The aftercontrol mechanism which is available in the tabletting machine then changes the filling of the machine and thereby the weight.

Further features of the invention are the subject matter of subclaims.

Figure 2:
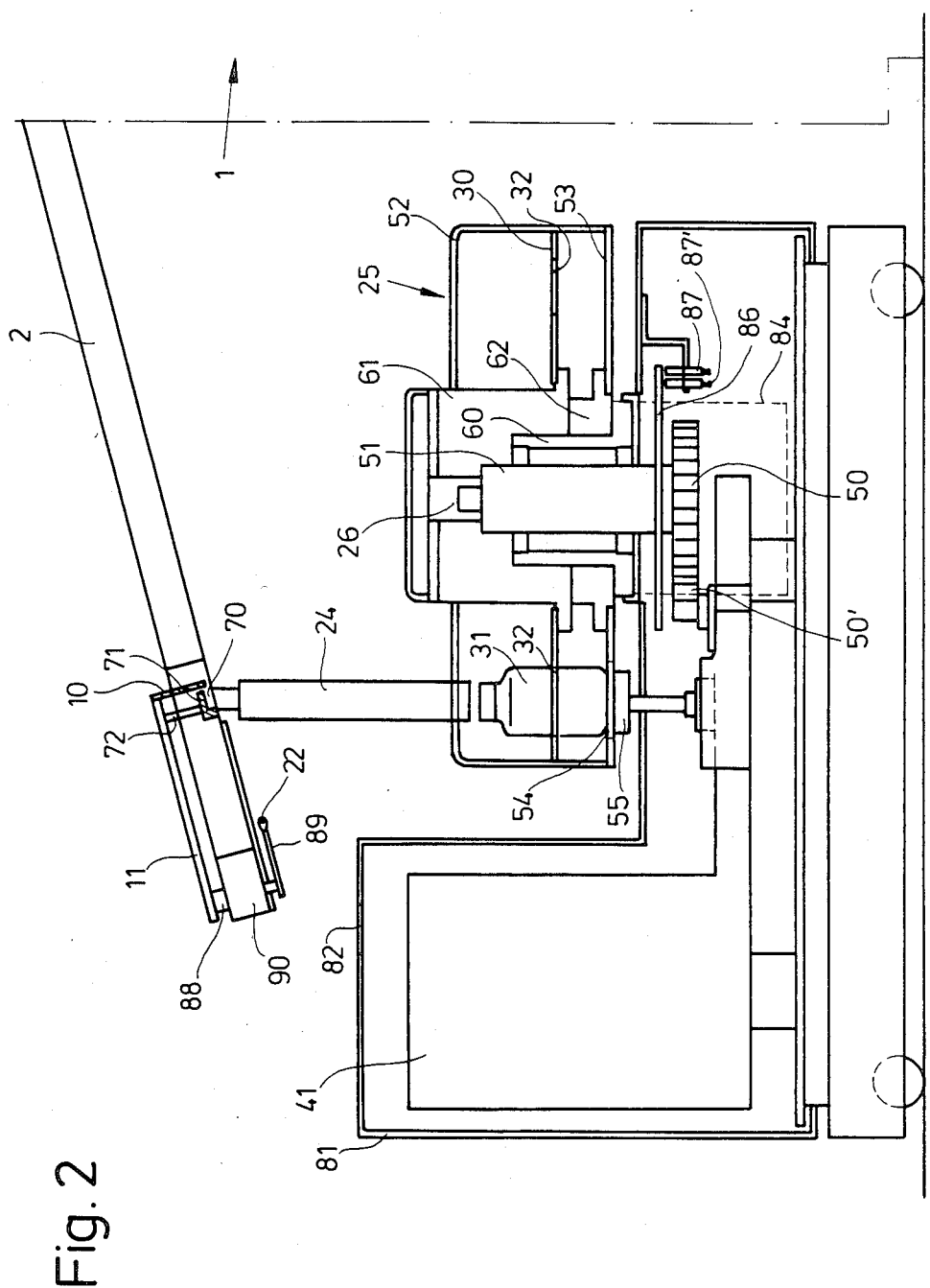
Figure 3:
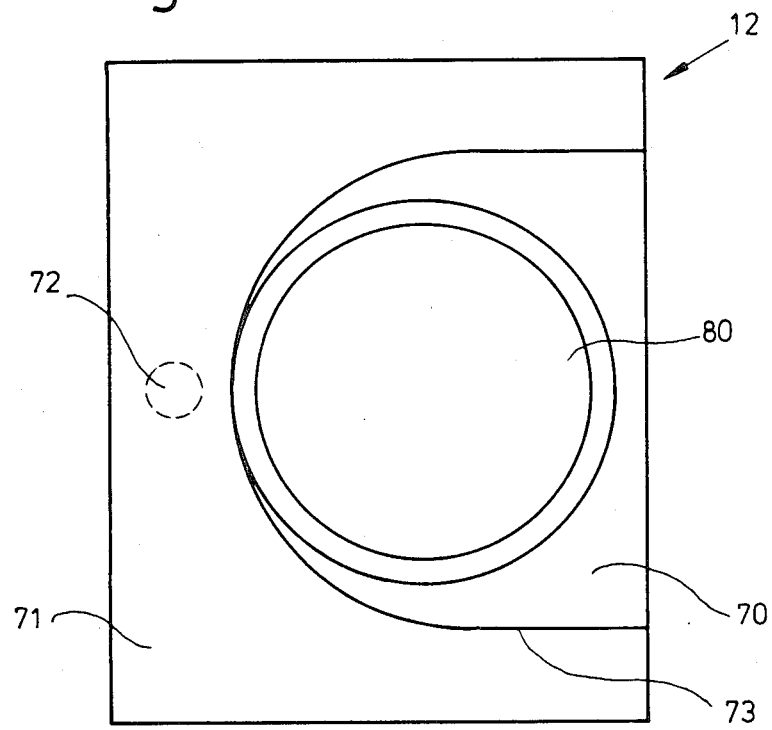
Figure 4:
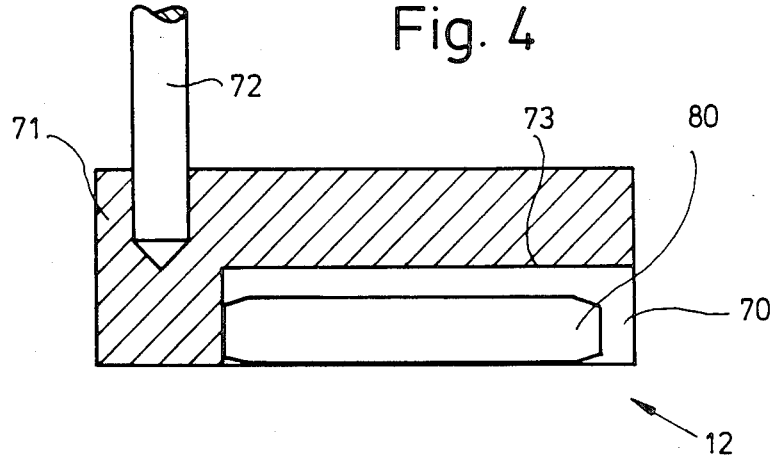

The invention is explained in the following in conjunction with the drawing. The drawing shows:

FIG. 1 the removal and testing device in a plan view;

FIG. 2 the removal and testing device in a side view;

FIG. 3 the cage for receiving a tablet in a view from below;

FIG. 4 the cage for receiving the tablet in a side view or in a sectional view and FIG. 5 a partial sectional view of the control disk of the testing device.

In the device illustrated in FIGS. 1 and 2 a tabletting machine for making tablets 80 which in a partical flow is released from the tabletting machine 1 through a chute 2, whereby the device is located at the right of the limitation illustrated with dash-dot lines.

If it is noted due to the press force control that the tablets do not correspond to the requirements, they are removed through another conduit 3.

For removing random samples a pivotable arm 11 is provided which is provided with a head carrying a cage 12 for receiving an individual tablet 80. A baffle plate 10 is connected with this cage 12 which together with the arm 11 or cage 12 has to be pivoted into the particle flow and which has to be pivoted out therefrom after removing an individual tablet in accordance with the dash dotted lines in FIG. 1.

In the pivoted condition a plurality of tablets 80 move against the baffle plate 10, whereby one individual tablet is redirected into the U-shaped recess 73 of the cage 12. Hence, the object is not to remove a defined particle from the particle flow, but a given partical of a plurality therefrom so as to test the quality statistically.

In a tabletting machine 1 the pressure force is already measured so that one can conclude the weight of the tablet in accordance therewith. However, it had been shown to be advantageous if the correlation between these two dimensions is individually tested by individual testing with a scale.

A motor 20 is provided for the positioning movement of the pivotable arm 11 which rotates a disk 21 on which a push and pull rod is rotatably mounted in an eccentrical manner thus pivoting arm 11 reciprocally. During a turning of the disk 21 the arm migrates from the dash-dotted illustrated initial line into the operating position illustrated in straight lines in FIG. 1 and returns again to the initial position. The switching on and off of motor 20 is controlled by an approximation initiator 23 which is actuated by the arm 11 in the rest position.

The withdrawal or the removal of the individual tablets is performed in a genuine accidental possibility, whereby the number of the tablets for a smaple and the start of the withdrawal of the samples are preselected as parameters.

After the withdrawal each tablet is individually weighed and the result is processed in a connected computer. Thereby, the measured weight can be indicated on a display or it can be printed. Thereby, the individual data, the time and the numbers of the pressed tablets as well as the pressure values of the maximum and minimum values of the tablets of this sample as well as the amount of the tablets which are outside of two preselected limits can be printed in a production protocol.

After the removal of a single tablet 80 the same is moved from the initial position of cage 12 into an oblique downwardly directed chute 24 on which it is moved to a container 31 which is positioned in a hole 32 of an apertured disk 30 which is mounted in a magazine 26 which is a component of the test device 25.

The apertured disk 30 is provided with eleven holes for receiving eleven containers 31 which are arranged in a twelve arrangement by omitting one hole 32 in the so-called empty adjustment range 40.

The apertured disk 30 can be turned clockwise, whereby the individual containers are taken along and are consecutively fed to a scale 41. The bottom of container 31 slides during the rotation of the apertured disk 30 on the bottom 53 of housing 52 of magazine 26. An opening 54 is provided in this bottom 53, wherein the plate 55 of a scale 41 is provided for the containers with their contents.

The drive of the apertured disk 30 is performed by a set motor 84 in accordance with FIG. 2, as well as a sprocket 50 in cooperation with a drive 50' by means of drive shaft 51.

The containers 31 may be filled with one or a plurality of tablets. Customarily the filling is performed with a plurality of tablets, which are individually weighed. For this purpose the empty container 31 is at first weighed on the scale. Thereafter the scale is adjusted to zero, so that a subsequently fed tablet can be weighed individually and the result can be registered. During the filling with a plurality of tablets a tare elimination is performed after each weighing of a tablet, that is, before the weighing of each tablet a new tare value is formed.

After the filling of a container 31 with one tablet or a pluralities of tablets 80 the apertured disk 30 of the magazine 26 is displaced in the direction of the arrow, that is, it is rotated in the clockwise direction so that a subsequent container 31 may be used on the scale. Since a contact still exists between the apertured disk 30 with container 31 after the drive motor has been switched off it is provided that the apertured disk 30 is turned back in a certain dimension the plate 55 of the scale after feeding a container, so that the edge of the hole 32 is free from container 31 so that the same is not hindered in establishing its accurate weight.

When all eleven containers are filled, they can then be exchanged together with the magazine 26 and its apertured disk 30 against a different magazine with further eleven containers. This is so inserted that the empty position range 40 is positioned in deviation from the illustration in FIG. 1, in that it is positioned above the scale or the scale plate 55 as an initial position for the use of a first to be weighed container.

The apertured disk 30 is connected with a support element 61 which supports on a support element 60 and rests on a collar 62.

The electronic scale 41 is placed adjacent to the magazine 26 in a housing 81 which is provided with a window 82.

A control disk 86 is provided cooperating with two approximation initiators (NI) 87 and 87' for controlling the drive of the magazine and in particular the apertured hole 30 with the containers 31.

In accordance with FIG. 5 the control disk 86, which is shown in a segmented plan view, is provided with a plurality of pairs of apertures 100 and 101, whereby the two apertures 100 and 101 of a pair of apertures are radially offset with respect to each other, whereby the outer positioned apertures 101 are mounted on a common circle as well as the inner positioned apertures 100 which are mounted on a common inner circle. The distribution of the arrangement of the apertures is the same corresponding to the arrangement of the holes in the apertured disk 30, that is, in accordance with the twelve distribution, whereby only eleven pairs of holes 100 and 101 are provided and in the twelfth area only one outer disposed aperture 102 is provided which is arranged on the circle of apertures 101.

Two radially offset approximation initiators 87 and 87' are mounted below the control disk 86, whereby the inner disposed approximation initiator 87' is disposed by a slight amount behind the outer disposed approximation initiator 101 seen in the rotating direction. These approximation initiators 87 and 87' are commercial switches which operate contactless for controlling the apertured disk 30, that is, for idling the apertured disk 30 after the transport of a container to the scale and for a subsequent return movement of the apertured disk for a free positioning of the container to be weighed. For this purpose the outer disposed apertures 101 of the control disk 86 are used for the actuation of the first initiator 87 and the inner disposed apertures 100 of the inner disposed second initiator 87'.

When the empty position range 40 of the apertured disk 30 is disposed in the area of the scale plate 55, after inserting a magazine, the individual aperture 102 is disposed above the outer approximation initiator 87, so that the same is not loaded and therefore has the level "low" (L) in contrast to the other initiator 87' which is loaded because of a missing aperture and is at a level "high" (H). After feeding a pulse to the motor 84 for rotating, that is, for initiating the first movement phase both initiators 87 and 87' are loaded and are in a posiion "H". When the first opening of the apertured disk 30 moves over the scale plate 55 the outer approximation initiator 87 moves at first to "low" (L), while the second approximation initiator 87' is still in the position "H", because this second approximation initiator 87 is displaced in the direction of the rotation. This corresponds to the signal "motor stop". Due to a forced afterrunning until stopping the second aperture 100 reaches the second initiator 87' and places it into position "L". This triggers the pulse for the return position of the motor 84 for returning the apertured disk 30, so that the position is obtained for the first approximation initiator 87="L" and the second approximation initiator 87'="H". This represents a stop for motor 84 or the apertured disk 30 in a position wherein the edges of the opening of the apertured disk 30 are free from a contact with the wall of the container being mounted on scale 41, so that an accurate measuring can be performed. This operation repeats until the point in time at which the control disk 86 is positioned with only one aperture 102 over the outer positioned initiator 87 and causes a final stopping of the device. The operation of the feeding of the containers is repeated for eleven times continuously until it comes to its complete stop at the twelfth movement.

FIGS. 3 and 4 more clearly illustrate the structure of cage 12. It consists of a catch sheet metal 71 which limits at its edge a U-shaped chamber 70 and covers its upper side. The cage 12 is provided with a rod 72 which connects it with its arm 11. Arm 11 is connected with an axis 88 which is mounted in a support element 90 and supports a lever 89 which is connected to the pull and pushing rod 22.

The aforedescribed device in accordance with the invention is not limited in its use for removing tablets for testing by means of weighing but is also suitable, for example, for testing work pieces, like screws, nuts or the like.

A further control possibility of the apertured disk 30 with the assistance of the control disk 86 and the approximation initiators are the following: During the rotation of the apertured disk 30 and thereby also the control disk 86 both approximation initiators NI 1 and NI 2 are positioned on "high" (H). At first the NI 1 comes to a "low" (L). This signal can be used to reduce the throughput speed. When the NI 2 also goes on "low", the rotating direction goes into reverse. The return movement is stopped when NI 1 and NI 2 again reach the "high level". Now the container 31 is disposed free on scale 41 without the apertured disk 30 touching the container 31. During a renewed start the immediatly generated "low level" of the approximation initiator is made uneffective by a time relay, for example.

This operation is repeated until the point in time at which the control disk 86 is disposed with only one aperture 102 above the NI 1. In view of the fact that the missing aperture of the NI 2 cannot reach "low", no return movement is effected, but after the operation of an adjustable time the predetermined stopping is obtained.

This control possibility has the advantage that the motor afterrunning, which is friction dependent after the switching off, is replaced by a rotation of a lesser speed and that the return movement is predetermined to a defined amount by offsetting the approximation initiators NI 1 and NI 2, so that the edge of the hole 32 of the apertured disk 30 has the same circular distance to the container 31.

I claim:

1. Device for testing, in particular tablets with a scale on which the tablets, which are being filled into containers, are individually weighed, characterized in that the device is provided with an arm (11) which can be pivoted into the tablet flow, which at its head is provided with a cage (12) for receiving an individual tablet (80) and transferred to a container (31) which is disposed in a hole (32) of a rotatably mounted apertured disk (30) under which a scale (41) for the container (31) is mounted.

2. Device in accordance with claim 1, characterized in that the apertured disk (30) and a plurality of containers (31) are mounted in a magazine (26), whose bottom (53) is provided with an opening (54) in which the plate of the scale (41,55) is positioned for a container (31).

3. Device in accordance with claim 1, characterized that a baffle plate (10) is connected to cage (12).

4. Device in accordance with claim 1, characterized in that a set motor (20) is provided for the pivot movement of arm (11) with associated cage (12).

5. Device in accordance with claim 1, characterized in that the apertured disk (30) is provided with a drive (50,50' 84) for a stepwise rotation in accordance with the aperture distribution of the apertured disk (30).

6. Device in accordance with claim 5, characterized in that the drive (50,50' 84) causes a return movement of the apertured disk (30), after a rotating movement.

7. Device in accordance with claim 5, characterized in that a control disk (86) is mounted on the drive shaft (51) for controlling the drive (50,50' 84) of the apertured disk (30), whereby the control disk is provided with apertures (100,101,102) for switching approximation initiators (87,87').

8. Device in accordance with claim 7, characterized in that each two apertures (100,101) are radially offset with each other in the control disk (86) in accordance with the aperture distribution of the apertured disk (30) and which cooperate with two corresponding radially offset approximation initiators (87,87').

9. Device in accordance with claim 8, characterized in that the two approximation initiators (87,87') are arranged in series in the rotating direction of the control disk (86).

10. Device in accordance with claim 8, characterized in that only one individual aperture (102) is provided in the control disk (86) between two pairs of apertures (100, 101) in accordance with the aperture distribution of the apertured disk (30).

11. Device in accordance with claim 10, characterized in that the individual aperture (102) of the control disk (86) is arranged in an offset position by about 180° with respect to an empty position range (40) of the apertured disk (30).

* * * * *